Nov. 9, 1937.  R. JARRIER  2,098,247
AUTOMATIC BAG FILLING AND WEIGHING MACHINE
Original Filed March 24, 1932  2 Sheets-Sheet 2
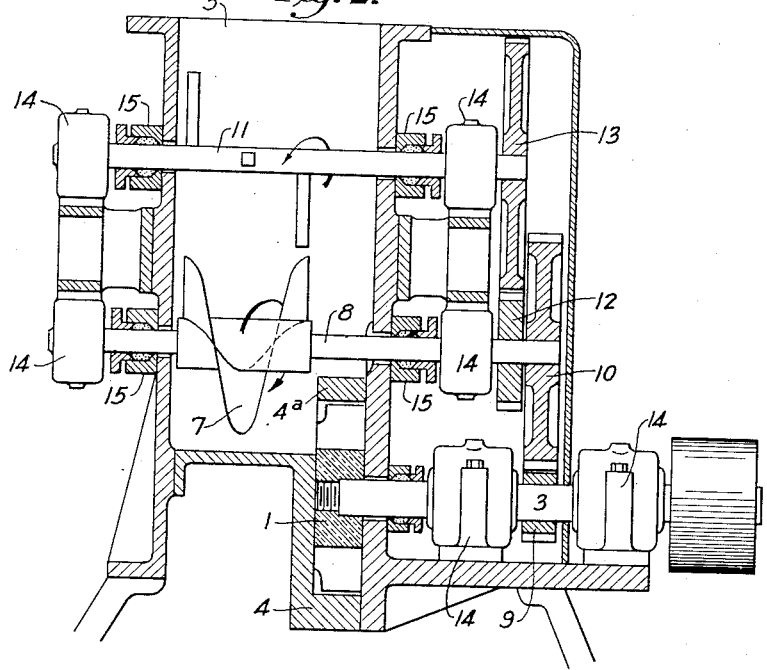
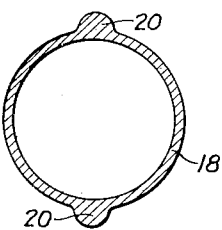
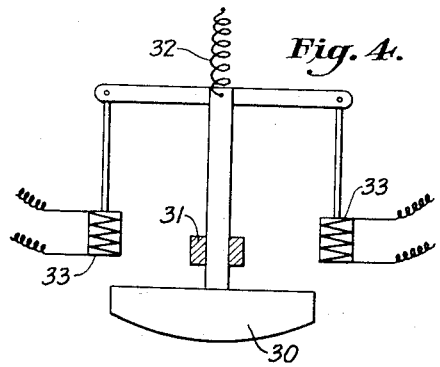
INVENTOR,
René Jarrier
BY
ATTORNEYS Patented Nov. 9, 1937

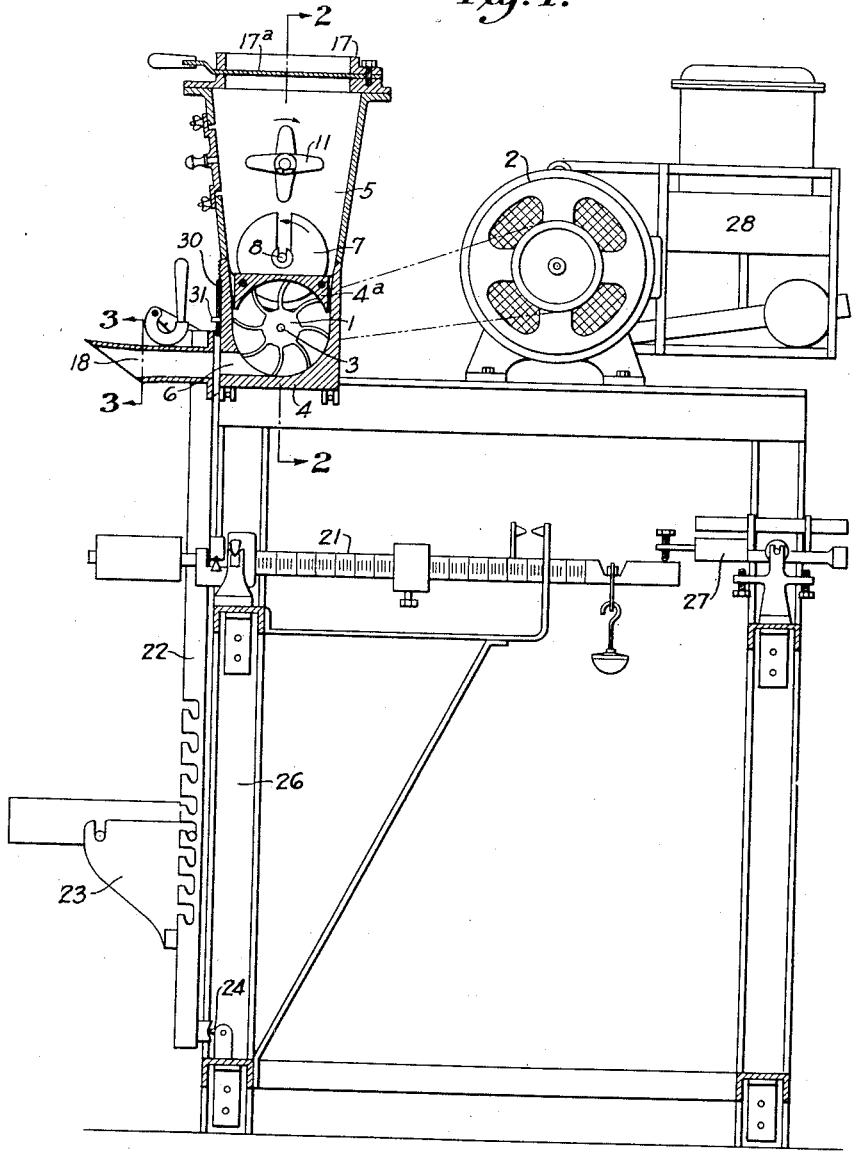

2,098,247

UNITED STATES PATENT OFFICE 2,098,247

AUTOMATIC BAG-FILLING AND WEIGHING MACHINE

René Jarrier, Saint-Quentin, France, assignor to Bartlett Arkell, New York, N. Y.

Application March 24, 1932, Serial No. 600,885. Renewed February 17, 1937. In France January 19, 1932

5 Claims. (Cl. 198—128)

The present invention relates to improvements in automatic bag-filling and weighing machines for filling bags with powdered or granulous materials. These machines are composed of the combination of a bag-filling device, consisting generally of a scoop-wheel, sometimes with a forced feed, with a weighing mechanism having associated therewith means to bring about a cessation of the filling of the bag when the weight of the bag has reached a predetermined value. In certain machines of this type, the filling of the bag ceases at the desired moment in consequence of the stoppage of the main shaft of the machine, and, consequently, the stoppage of all the parts of the machine. The stoppage is then a total one, until the machine is started again after the filled bag has been replaced by an empty one. When the machine is driven by an electric motor, the stoppage may be brought about by stopping the motor by breaking its feed circuit by means of an interrupter controlled by the beam of the weighing mechanism, a steelyard for example. In other machines the stoppage of the filling of the bag is obtained by simply closing the channel through which the material is pushed.

The improvements brought by the present invention to this type of machine will appear in the course of the description given below of an embodiment of an automatic bag-filling and weighing machine improved according to the invention. This embodiment, which is shown in the drawings, is however given only by way of example, and the improvements which form the subject of the invention may be applied generally to the types of machines mentioned above.

In the drawings,

Figure 1 is an assembly view of the machine, with certain parts in section;

Fig. 2 is a section on an enlarged scale taken on the line 2—2 of Fig. 1;

Fig. 3 is a section taken on the line 3—3 of Fig. 1, on a still larger scale; and Fig. 4 shows an embodiment, diagrammatically, of the cleaning device.

In the embodiment shown, the bag-filling device proper consists essentially of a scoop-wheel 1, the scoops of which are preferably concave in the direction in which the wheel rotates. The scoop-wheel is given rotation by an electric motor 2, which drives, by a belt, shaft 3 upon which wheel 1 is simply screwed. This wheel rotates within a casing 4 disposed at the base of feed hopper 5. In accordance with a characteristic of the invention, this casing 4 completely surrounds the periphery of the wheel in order that the material introduced between the scoops may not be discharged from the periphery at any other point than that where the packing channel or throat 6 opens. Casing 4 may be in a single piece, but, to facilitate fabrication, it preferably comprises the removable cover part or roof 4a. Its interior surface, instead of being cylindrical as shown, may be the shape of a truncated cone, with the large base turned toward the screw. Furthermore, and according to another characteristic of the invention, the outside diameter of the scoop-wheel may be less than the interior diameter of the casing, in such wise that there is formed, on at least one side of the wheel, an unoccupied space, which serves to collect the metallic grains such as those which are usually encountered in large numbers in cements made from slag or clinkers, and which usually bring about a blockage of the wheel. Experience has shown that the above-indicated measure will abolish all blockage due to this cause. This unoccupied space may be obtained, notably, by cutting off the tip of each scoop on the side adjacent to the feed screw (Fig. 2).

In the interior of hopper 5 there is moreover mounted an Archimedean screw 7 keyed upon a shaft 8 parallel to the axis of rotation of wheel I, and separated from this axis by a distance less than the sum of the radii of screw 7 and wheel 1. It may therefore be seen that screw 7 is at the side of wheel 1, and that in turning it pushes the material axially between the scoops of wheel 1. Screw 7 is caused to rotate by a train of gears 9, 10, which between them connect shafts 3 and 8. It will be noticed that, according to a characteristic of the invention, the propelling screw 7 is slotted longitudinally for the entire height of a radius, in such wise that it may be clamped directly upon shaft 8 instead of being slipped on to it. A stirring device 11 is mounted above screw 7, and is driven from shaft 8 by a gear train 12, 13. It will be noticed, moreover, that all the bearings 14 of the shafts which go to the interior of the hopper are disposed on the exterior of this hopper, and stuffing boxes 15 are disposed at each place where the shafts come out, in such wise that the bearings are effectively protected against the infiltration of material.

In order to facilitate access to the parts within the hopper, as well as to facilitate the dismounting of these parts, casing 4 is disposed in the base of hopper 5, and at the same time forms the bottom of it, and is attached to the hopper by bolts or other devices enabling it to be removed easily. This enables the hopper to be cleared easily. The wheel may be unscrewed and the screw 7 may be dismounted without touching the driving mechanism, shafts and gear wheels, or their supporting bearings. This constitutes one of the characteristics of the invention.

Hopper 5 is connected at its upper part with tubing 17, which is of circular section, because it is recognized that a circular section lends itself better than any other section to permitting cement, chalk, plaster, and similar material to flow.

This tubing 17 may be closed by a trap 17a, which pivots and engages in a slot which extends almost half way around the circumference of the tubing; a joint-cover, which is not shown, enables this slot to be covered.

As is usual, the packing orifice or throat 6 is prolonged by a filling tube 18 which engages with the valve of the valve bags or which carries some arrangement to support the open bags. According to a characteristic of the invention, the tube 18 widens in diameter in the direction in which the material moves; the interior diameter, for example, increasing ten per cent. from one end of the tube to the other. In addition the entry diameter of the tube is preferably somewhat greater than the diameter of orifice 6.

In order to enable the air to escape along the length of the tube, this tube has on its external surface longitudinal ribs 20 of semi-circular section, for the purpose of preventing the wall of the bag from flattening on the tube; it is thus that passages for the escape of air from the bag are arranged.

The tube 18 is suspended, in well-known wise, by means of a bar 22 which also supports a saddle 23 adjustable for height along the length of this bar, and which saddle is destined to support the base of the bag while it is being filled. The balance used is a steelyard, the loading arm of which has been reduced in length in comparison with the other arm in such wise that the vertical displacement of the tube is very small (about two millimeters). The bar 22, which tends to turn to right or left, at its lower end rests against a horizontal knife-edge 24 hinged to frame 26 on which the steelyard is suspended. The extremity of the large arm of the beam cooperates with a hinged arm 27 which is disposed in such wise that it is touched by the extremity of the beam when the beam reaches its position of equilibrium. The hinged arm 27 actuates an interrupter which controls the feed circuit of electric motor 2, and which works in such wise as to break the circuit when it pivots upon the shock of the beam coming against it. From this there follows a stoppage of motor 2 and of all the bag-filling mechanism, a stoppage which an electro-magnetic brake 28 makes more rapid still. This combination of the beam with a hinged arm which actuates an interrupter does not form part of the present invention, and it is described here only in order that the operation of the entire machine may be understood.

In order to ensure that tube 18 functions easily, it is preferably provided, and this forms still another characteristic of the invention, with some arrangement to clean automatically and periodically the space purposely left between the inner end of tube 18 and the corresponding wall of the hopper in order to avoid any friction. It may for example, be provided with a control system such that the device comes into action each time the machine stops, that is to say each time a bag is about to be filled. An embodiment of this device is shown in Figure 4, solely by way of example. In this example, the device comprises a wiper plate 30 able to slide in the space between the exterior wall of the hopper and the base of tube 18. This wiper is guided longitudinally in a bearing 31 in said wall, and a spring 32 tends constantly to draw it upwardly, while electromagnetic solenoids 33 urge it downwardly when they are excited. The circuit to excite these electro-magnets may be controlled through any suitable means by the pivoting arm 27 in such wise as to close the exciting circuit when arm 27 pivots under the action of the beam.

Evidently a number of machines might be disposed side by side, and grouped, for example, on the same framework 26, which would consequently be elongated. Such a grouping is then similar to a machine with a number of bag-filling mouths, in which each mouth is fed by an entirely automatic device.

As will be evident to those skilled in the art, my invention permits various modifications without departing from the spirit thereof or the scope of the appended claims.

What I claim is:

1. In a bag filling machine of the class described, the combination of a hopper having a discharge throat near its lower end and an upwardly opening pocket leading into said discharge throat, a propeller mounted in said pocket having its axis arranged substantially horizontal and its sides arranged in proximity to the sides of the pocket, the upper portion of said propeller projecting above the upper end of said pocket, a cover extending over the upper portion of the periphery of said propeller, and means for forcing material sidewise between the portions of the blades projecting above said pocket.

2. In a bag filling machine of the class described, the combination of a hopper having a discharge throat near its lower end and an upwardly opening pocket leading into said discharge throat, a propeller mounted in said pocket having its axis arranged substantially horizontal and its sides in proximity to the sides of the pocket, the upper portion of said propeller projecting above the upper end of said pocket, a cover extending over the upper portion of the periphery of said propeller, and a screw conveyor for forcing material sidewise between the portions of the blades projecting above said pocket.

3. In a bag filling machine of the class described, the combination of a hopper having a discharge throat near its lower end and an upwardly opening pocket leading into said discharge throat, a propeller mounted in said pocket having its axis arranged substantially horizontal and its sides arranged in proximity to the sides of the pocket, said propeller having blades extending generally radially and the upper portion of said propeller projecting above the upper end of said pocket, a cover extending over the upper portion of the periphery of said propeller, and means for forcing material sidewise between the portions of the blades projecting above said pocket, the portion of the inner wall of said pocket and cover surrounding the periphery of said propeller being substantially cylindrical and being arranged in close proximity to the outer ends of the blades of the propeller.

4. In a bag filling machine of the class described, the combination of a hopper having a discharge throat near its lower end and a pocket leading into said discharge throat, a rotary propeller mounted in said pocket and suitably constructed and arranged so as to tend during the operation thereof to direct material from said pocket through said throat, said pocket completely enclosing the sides and periphery of said propeller except there is left uncovered a portion of one side of the propeller at one side of the axis thereof, means for presenting material to said uncovered side portion of the propeller, said pocket having a discharge orifice spaced circumferentially a distance from said uncovered side portion greater than the distance between the outer ends of adjacent blades of the propeller.

5. In a bag filling machine of the class described, the combination of a hopper having a discharge throat near its lower end and a pocket leading into said discharge throat, a rotary propeller mounted in said pocket and suitably constructed and arranged so as to tend during the operation thereof to direct material from said pocket through said throat, said pocket enclosing the sides of the propeller except there is left uncovered a portion of one side of the propeller at one side of the axis thereof, and means for presenting material to said uncovered side portion of the propeller, said discharge throat being spaced circumferentially a distance from said uncovered side portion greater than the distance between the outer ends of adjacent blades of the propeller.

RENÉ JARRIER.